(No Model.) 3 Sheets—Sheet 1.

E. A. SPERRY.
POWER GEARING FOR VEHICLES.

No. 434,098. Patented Aug. 12, 1890.

Witnesses
J. B. Dover.
C. W. Seville.

Inventor:
Elmer A. Sperry
By Francis W. Parker
Atty.

(No Model.) 3 Sheets—Sheet 2.

E. A. SPERRY.
POWER GEARING FOR VEHICLES.

No. 434,098. Patented Aug. 12, 1890.

Witnesses:
S. B. Dover.
C. W. Seville

Inventor:
Elmer A. Sperry,
By Bakewell & Parker,
Attys.

(No Model.) 3 Sheets—Sheet 3.

E. A. SPERRY.
POWER GEARING FOR VEHICLES.

No. 434,098. Patented Aug. 12, 1890.

Witnesses:
S. B. Dover.
C. W. Seville

Inventor:
Elmer A. Sperry
By Bauer W. Parker
Atty.

United States Patent Office.

ELMER A. SPERRY, OF CHICAGO, ILLINOIS.

POWER-GEARING FOR VEHICLES.

SPECIFICATION forming part of Letters Patent No. 434,098, dated August 12, 1890.

Application filed July 14, 1890. Serial No. 358,594. (No model.)

*To all whom it may concern:*

Be it known that I, ELMER A. SPERRY, a citizen of the United States, residing at Chicago, in the county of Cook and State of Illinois, have invented a new and useful System of Power Distribution for Vehicles, of which the following is a full, clear, and exact specification.

My invention relates to systems of power distribution for vehicles; and it consists in details of construction and features by means of which power may be generated from one or more sources on the vehicle and distributed to the trucks of such vehicle, allowing the trucks while retaining their connection to the source of power to be deflected in such a manner as to pass easily around curves in the track, and generally to cheapen and render practical the distribution of power upon the running parts of vehicles, and other features hereinafter referred to, described, and shown.

Figure 1:
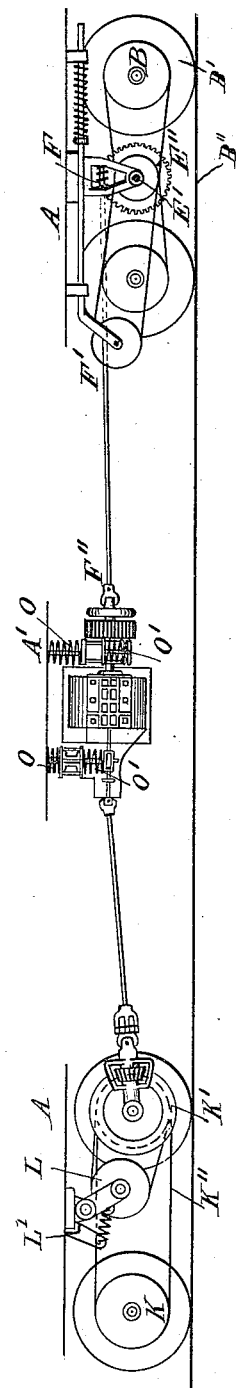
Figure 2:
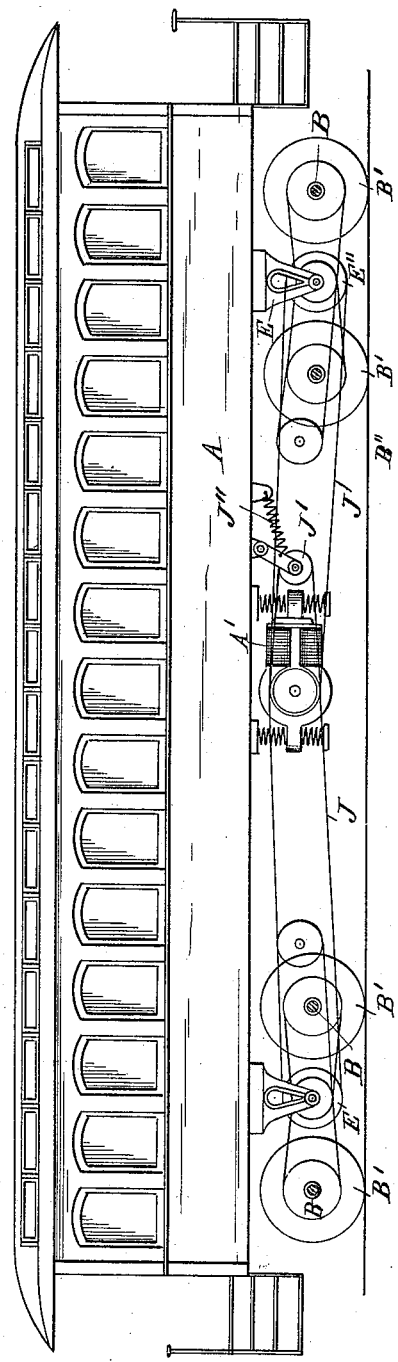
Figure 3:
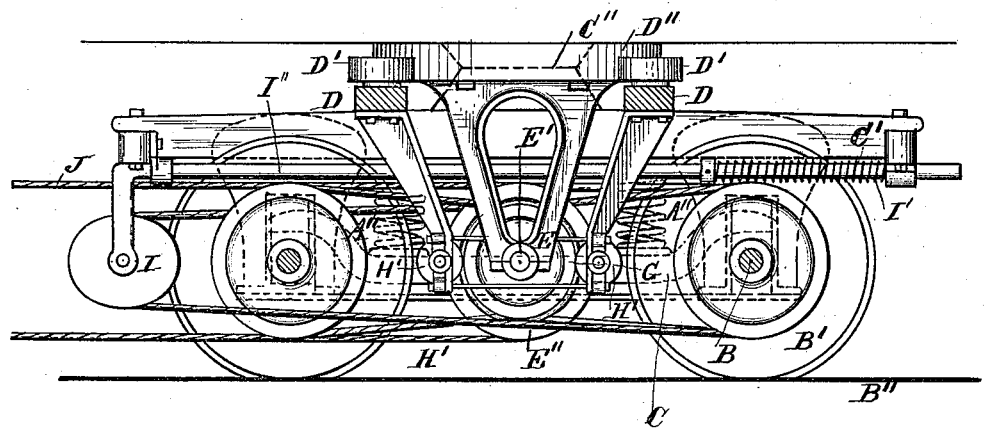
Figure 4:
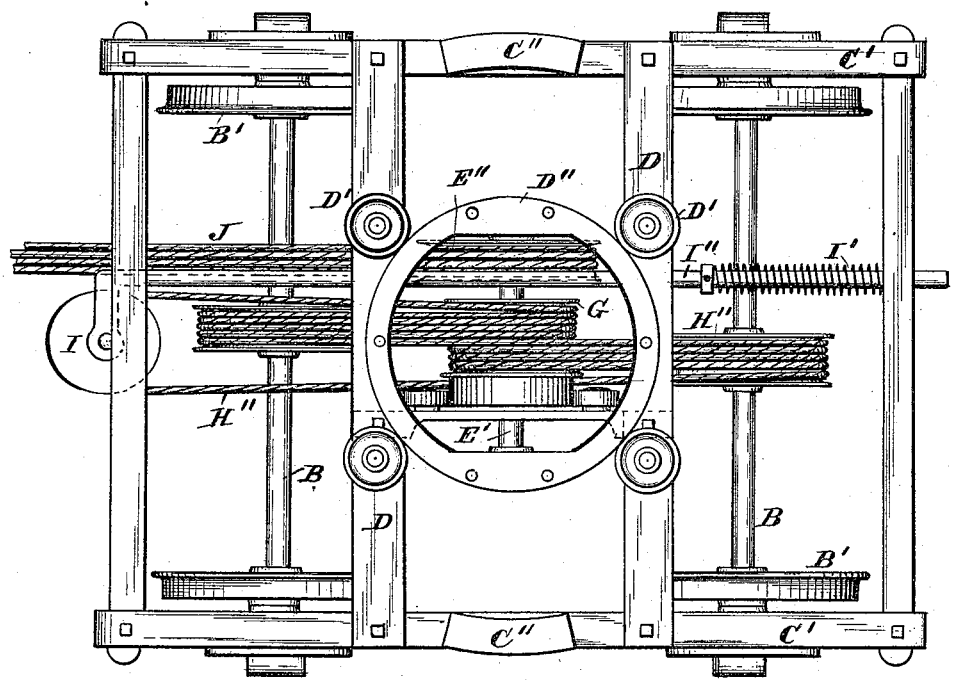
Figure 5:
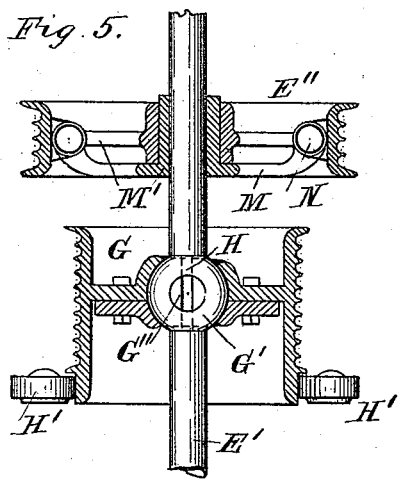
Figure 6:
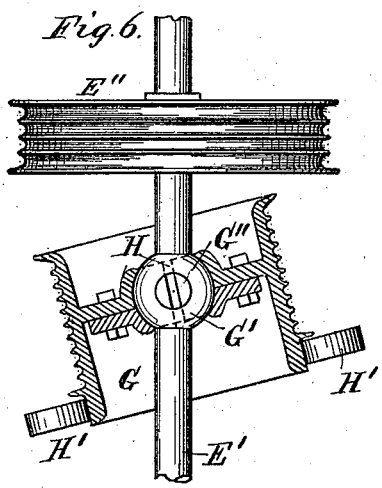
Figure 8:
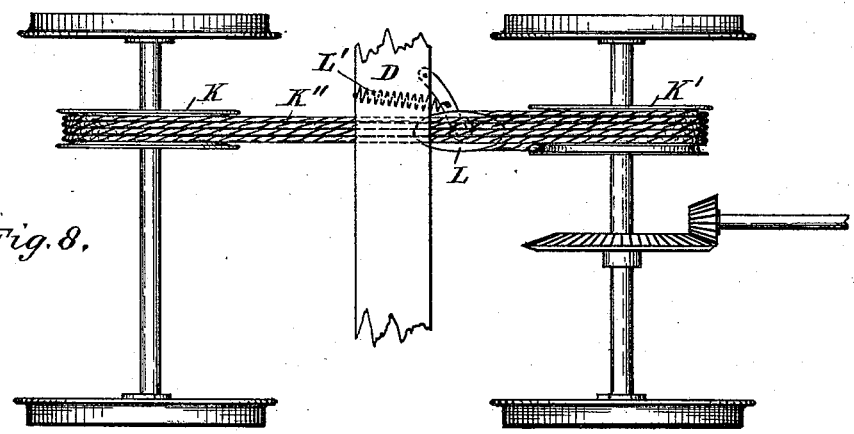
Figure 7:
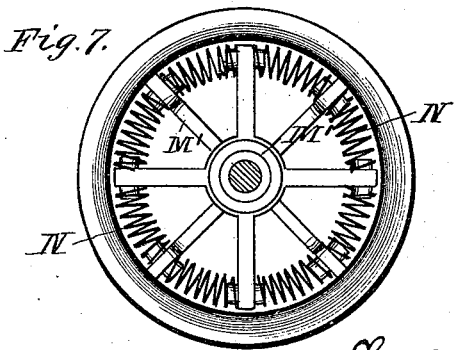

In the drawings, Figure 1 is a side elevation of the lower portion of a car with parts omitted, showing motor and two trucks. Fig. 2 is the same, showing body of car and with modifications. Fig. 3 shows side elevation of truck used in Fig. 2. Fig. 4 shows a plan view of same. Figs. 5, 6, and 7 show details of the transmitting devices. Fig. 8 shows a plan view of a portion of the truck shown to the left in Fig. 1.

Like letters of reference indicate similar parts throughout the several views.

A is the car-body mounted upon trucks, which in the views are shown to rest under each end of the car. This, however, is not essential. The motor A' is elastically supported by springs—as, for instance, the springs A'' (see Fig. 3)—located between said motor and the axles B of the trucks, the wheels B' of the trucks resting upon the track B''. (See Figs. 1, 2, and 3.) The trucks are of any ordinary construction—as, for instance, that shown in Fig. 3, which allows of the individual elasticity and accommodation to the unevenness of the track of the various axles and parts, the discussion of which is gone into more fully in pending application, Serial No. 344,219. Upon the boxes of axles rests the equalizer C. The springs A'' rest upon the equalizer and support the frame C', upon which rests the car, by means of surfaces C''. A portion or the frame-work of the truck consists of the cross-bars D, upon which are mounted four rollers D', which act in conjunction with the large circle D'', which is attached to the car-body. This shows one means of driving the car from the truck, or vice versa, and at the same time allowing the truck to turn freely about curves and the like.

From the ring D'' depend two journal-bearing downward extensions E, which support the shaft E', carrying the same in an alignment, which also sustains a constant relation to the lines of the car-body, or substantially so. Other means may be employed to accomplish a like result. Upon this axle E' is mounted a power-receiving wheel E'', being in the case of Fig. 1 to the right a worm-wheel co-operating with the worm F, mounted upon the shaft F' and journaled at a point near F and supported at its other end by a universal joint F'', connected and receiving its power from the motor A', which in this case is an electric motor elastically mounted underneath and depending from the car-body. As the load increases or decreases or from other causes the axles B of the wheels approach or recede from the car-body by the rising or falling of either, the axle E' will remain in a fixed position, or substantially so, with reference to the car-body, and devices are herein shown which sustain a driving-connection between the axle E' and the motor, which are of such a character as would require that this alignment be substantially maintained. Devices are also shown mounted upon the shaft E', which will permit of a driving-connection being sustained between the car-axles B and the shaft, which will admit of a deflection of the alignment of such axles with reference to the lines of the car-body and yet sustain the proper power-transmitting connection thereto, and at the same time allow for the various individual movements of the elements of the truck, more fully described in the prior application above referred to. One of these devices consists in the pulley G, (shown more fully in Figs. 5 and 6,) which is mounted upon the axle E' by a ball-bearing G'. The ball, being welded and forming part of the axle E', has through it a hole filled by a plug G''.

The ends of the plug G'' are flattened and work in a groove (shown in dotted lines at H) cut in the concave surface of the hub of the pulley. Thus as the axle E' rotates the pin G'' also rotates, and its two extremities, working in the grooves H, drive the pulley G, and at the same time the pulley G is permitted to stand and work at an angle with the axle E', while the power is transmitted to it by the pin G'', the ends of which slide backward and forward in the groove H as the process goes forward. A device to aid in maintaining this pulley in constant alignment with the truck may consist of idlers H', Figs. 3, 4, 5, and 6, which are mounted upon the cross-piece D of the truck and partake of all the motions of rotation of the truck as a whole about its center of gyration. The pulley G is in this case a compound pulley, half of which sustains a power-driving relation with one axle B, while the other half sustains a power-driving relation with the other axle B of the truck. This connection is made, as shown, by an endless-rope transmission, which in this case consists of a single rope for both. This rope is indicated by the letter H'', and at one point in this loop passes about the pulley I, which is thrust outward, so as to keep a tension upon the rope by means of spring I', operating upon the supporting-bar I'' for such pulley.

The shaft E' in Figs. 2, 3, 4, 5, and 6 is also driven by a rope transmission from the motor, which is shown more comprehensively in Fig. 2. This driving-rope is indicated by letter J, and is also furnished with a tension-trolley J', the tension being derived from spring J''. In Figs. 1 and 8 the power is received from the motor through a gearing similar to that in the former application above referred to, and the power driving-connection is sustained to the other axle of the same truck by a rope transmission working upon the pulleys K and K' of equal size, or bearing a ratio to the traction-wheels to which they are connected, the rope in this case being indicated by the letter K'' and the tension-trolley by the letter L, which in this case is retracted by the spring L'.

It is obvious that many features as above described could be greatly altered and some of them dispensed with or replaced by others without departing from the spirit of my invention, and it will be apparent that a large range of mechanical equivalents could be employed in certain portions of the apparatus without affecting the law of its operation. It is equally apparent that some or all of the several features of the apparatus as hereinbefore illustrated could be used with or without the usual remaining parts. For example, the invention could be equally applied to a car with single truck, &c.

The shaft E', which depends from the car-body, is supplied with the pulley E''. This pulley may be tight upon the shaft; but preferably it is mounted loosely, as shown in Figs. 5 and 7. In Fig. 5, M represents a stationary hub and arms which engage one end of the spring N. The pulley-arms M' have a separate hub, which is loose upon the exterior of the stationary hub M. These arms engage the opposite end of the springs N, and as the pulley is turned in either direction compression-strains come upon the springs N of either one side or the other of the arms M' and cause rotation of the axle. This is to overcome any irregularity of motion that would take place through the operation of the ball-joint, especially when the pulley is working at an angle from the axis of the shaft. The faces of these pulleys and the number of strands of rope that each takes are shown in the drawings to be somewhat less than would actually be required to drive the maximum load or sustain the maximum strain by the friction in the grooves. The grooves are shown to be slightly rounding, as contradistinguished from the angular grooves generally used in connection with this art. The purpose of this will appear hereinafter.

In Figs. 1 and 2 the motor is shown mounted upon the car-body through the intervention of springs, the spring O being above and the spring O' being below and a heavy bolt guiding and supporting. This gives the motor an independent elastic support.

The use and operation of my invention are as follows: The source of power in driving the car is the motor. This power is delivered to the trucks by means of the shafts, universal joints, and slip-joints shown in Fig. 1, or by means of the rope transmission shown in Fig. 2. The system used to the left in Fig. 1, between the motor and the truck, is shown in the prior application above referred to, and the power-connections of the elements of the two axles of the truck are by an ordinary rope transmission, which consists of a single endless rope passing about the tension-idler mounted upon the swinging arm and retracted by the spring. To the right the power is delivered by a worm to a worm-wheel which is mounted upon the shaft E', which co-operates with the two axles of the truck and with suitably-grooved pulleys mounted upon each to communicate the power from the shaft to said axles by a single rope, which, after passing the trolley, passes around the smaller pulley around the shaft, then back upon the wheel next the trolley, back and forth between these two for several turns, then passes from the top of the wheel on the left-hand axle to the top of the wheel on the right-hand axle, then passes from this to the small intermediate pulley which is upon the shaft, and backward and forward between these two, preferably, for the same number of turns as upon the left-hand sheave, and from the under side of the right-hand sheave back to the trolley, making thus an endless transmission. This is shown to the right in Fig. 1, in Fig. 2, and in Figs. 3 and 4. This operation will be easily understood, as it follows the practice of ordinary rope transmissions.

The trolley in every case is furnished with an adjustable retracting device to keep a predetermined amount of tension upon all the portions of the transmission. The trucks are pivoted so as to make the curves in the track. The small wheel upon the axle E' is also pivoted and turns in such a manner as to keep its axis parallel with that of the two axles on the truck. This is aided by the idlers, which are shown in Figs. 3, 4, 5, and 6. The actions of the various parts will be understood from the drawings. The weight of the car is taken upon the surfaces C'', the pivot being replaced by the large collar and the four idlers which partially surround it. The large collar is mounted upon the car-body and the four idlers upon the truck.

It is a well-known fact that when power is transmitted through a universal joint or its equivalent the rate of rotation of the various parts in a single revolution differs. This fact, when applied to the elements of the gearing shown herein, renders desirable a method for introducing an elastic driving medium. The ropes themselves are slightly elastic, but not enough to avoid a perceptible oscillating or jerking motion of the car-body while making curves. I therefore introduce the connections N in the driver-wheel upon the axle E', which "gives and takes" as the variations of the motion require and overcomes entirely the objection.

It is a well-known fact that it is almost impossible to obtain car-wheels of exactly the same size, and where more than one is employed to give the tractive effect—as, for instance, eight wheels connected together for the purpose of driving simultaneously and at exactly the same speed—the larger ones tend to do all the work, and if all the elements are rigidly geared together by toothed gearing strains and pressures are created between the elements of the truck and the various portions of the rotating parts, which not only tend to rapidly destroy the machinery, but also occasion a constant and great waste of power. Springs have been resorted to, and other elastic driving mediums have been sought to avoid this. I obviate the troubles above named in the practical application of power to several elements, all of which are required to aid in the matter of traction, by supplying the various elements through the medium of power-transmitting devices which are inadequate for the supply of the total amount of power to any one of the elements. For instance, should one axle try to do all the work the ropes or other traction-transmission devices connected with that axle would slip and allow the adhesion of some other axle to come into play, the slipping, of course, being minute, and so on until all of the traction-gearing upon all of the axles were receiving about an equal amount of the total effort and all the wheels upon all the axles were doing about their proportionate amount of the total traction work. This system has been shown in practice to have, among other desirable features, the effect named, which is to allow a slight "give and take" to allow for the inequalities in the size of the wheels, inequalities of position of non-cylindrical surfaces of the traction-wheels upon the track, unevenness in the road-bed, passing frogs, short curves, &c., and, in fact, it has been found to subserve and accommodate itself to all of the varying requirements of a successful power-transmission for moving vehicles.

In carrying out my invention it will be seen that the same tension-trolley and same rope are used for both axles of a truck, and that also the same rope and a single tension device is used between each truck and the motor, so that the friction from the motor to each truck may be the same, and also within the truck the friction transmission to each element thereof may be the same, it being understood in the foregoing that the number of grooves in each receiving-pulley co-operating with a given rope is the same, and it being understood that different ropes can be used for these with separate tension-trolleys, or the same rope can be used for each groove with or without tension-trolleys.

Belts or other friction-connections between the traction-wheels or between the motor and running-gear, or both, may be employed.

The power-connection from the motor to the wheels and between the wheels is so arranged that it will allow the slipping of the rope or other friction driving medium which is connected to the traction-wheel before the traction-wheel itself will slip upon the track, thereby constituting what I term my "power-equalizing driving-connection."

I claim as new and desire to secure by Letters Patent—

1. The combination of a car-body with a motor thereon, two trucks pivotally connected thereto, wheels mounted on said trucks, two shafts mounted on the car-body, and driving-connections from the motor to the shafts and from the shafts to the wheels.

2. The combination of a car-body with a motor supported thereon, a truck pivotally connected with the car-body, wheels independently elastically mounted on said truck, a shaft supported on the car-body, and driving-connections from the motor to the shaft and from the shaft to the wheels.

3. The combination of a car-body with a motor thereon, a truck pivotally connected with the car-body, wheels mounted in said truck, a shaft supported on the car-body, a driving-connection from the motor to the shaft, and a driving-rope connection from the shaft to the wheels.

4. The combination of a car-body with a motor thereon, a pivoted truck connected with the car-body, wheels independently elastically mounted in the truck, and a driving-connection from the motor to both pairs of wheels, consisting of rope transmission.

5. The combination of a car-body with a motor elastically supported thereon, a truck connected with the car-body, wheels independently elastically mounted in the truck, and a driving-connection from the motor to the wheels.

6. The combination of a car-body with a motor elastically supported thereon, a truck connected with the car, and driving-connections from the motor to the truck.

7. The combination of a car-body with a motor elastically supported thereon, a truck connected with the car, wheels independently elastically mounted in the truck, and driving-connections from the motor to the wheels.

8. The combination of a car-body with a motor thereon supported elastically, a truck connected therewith, and a driving-rope connection from the motor to the wheels of the truck.

9. The combination of a car-body with a truck pivotally connected therewith, wheels mounted in said truck, and driving-rope connections between the axles of said wheels.

10. The combination of a car-body with a truck connected therewith, wheels mounted in said truck, a shaft mounted on the body of the car, driving-rope connections between the shaft and the axles of said wheels, and a tension device connected with said rope.

11. The combination of a car-body with a motor thereon, a truck connected therewith, a driving-rope connection from the motor to the wheels of the truck, consisting of a number of strands passing to and fro, and a tension device acting upon a single strand of such rope, the whole constructed and adapted to propel the car.

12. The combination of a car-body with a motor thereon, a truck pivotally connected therewith, and a driving-rope connection from the motor to the wheels of the truck, the wheels being independently elastically mounted upon the truck.

13. In a vehicle, the combination of two or more traction-wheels resting upon the road-bed with a power-equalizing driving-connection between them so organized as to permit the connection to slip between the traction-wheels and the motor, substantially as specified.

14. In a motor-car, two or more traction-wheels coupled with one and the same motor by a power-equalizing driving-connection, the latter so organized as to permit the connection to slip between either of the wheels and the motor, substantially as specified.

15. In a vehicle, the combination of two or more traction-wheels resting upon the road-bed with a power-equalizing driving-connection between them, said connection containing a pressure-equalizing tension device and so organized as to permit the connection to slip between the traction-wheels and the motor, substantially as specified.

16. In a motor-car, two or more traction-wheels coupled with one and the same motor by a power-equalizing driving-connection, the latter containing a pressure-equalizing tension device and so organized as to permit the connection to slip between either of the wheels and the motor, substantially as specified.

ELMER A. SPERRY.

Witnesses:
FRANCIS W. PARKER,
CARRIE A. LONGFELLOW.